United States Patent [19]

Kobayashi

[11] Patent Number: 5,079,424
[45] Date of Patent: Jan. 7, 1992

[54] RADIATION MEASUREMENT SYSTEM

[75] Inventor: Hiroaki Kobayashi, Ootawara, Japan

[73] Assignee: Kabushiki Kaisha Toshiba, Kawasaki, Japan

[21] Appl. No.: 492,829

[22] Filed: Mar. 13, 1990

[30] Foreign Application Priority Data

Mar. 14, 1989 [JP] Japan .................................. 1-61632

[51] Int. Cl.⁵ .............................................. G01T 1/208
[52] U.S. Cl. ................................ 250/369; 250/363.09
[58] Field of Search ..................... 250/369, 207, 363.09

[56] References Cited

U.S. PATENT DOCUMENTS

| | | | |
|---|---|---|---|
| 4,220,851 | 9/1980 | Whatley | 250/252.1 |
| 4,346,590 | 8/1982 | Brown | 250/256 |
| 4,904,865 | 2/1990 | Meisner et al. | 250/254 |

OTHER PUBLICATIONS

Belle, Volchok, Korovin, "A Four-Channel System for Stabilizing a Scintillation Gamma-Spectrometric Installation," Translated from *Pribory i Tekhnika Eksperimenta*, No. 5, pp. 82-84, Sep.-Oct. 1974.

Primary Examiner—Carolyn E. Fields
Assistant Examiner—James E. Beyer
Attorney, Agent, or Firm—Finnegan, Henderson, Farabow, Garrett and Dunner

[57] ABSTRACT

A standard light beam is incident on a photomultiplier tube (PMT) to adjust the gain of a preamplifier which serves to amplify the output signal of the PMT. A light-emitting diode which produces a standard light beam is fixed to the glass tube of the PMT by means of an attachment made of transparent resin. The standard light beam can therefore pass through the attachment. The light transmitting efficiency of the attachment is improved such that an ample quantity of the standard light beam can be supplied to the light-receiving face of the PMT. Even when the angle that the diode is attached to the glass tube is changed, the transmission of the standard light beam is not disturbed by the attachment, thereby enabling the quantity of the standard light beam supplied to the light-receiving face to remain substantially constant. Thus, gain adjustment can be accurately attained.

9 Claims, 6 Drawing Sheets

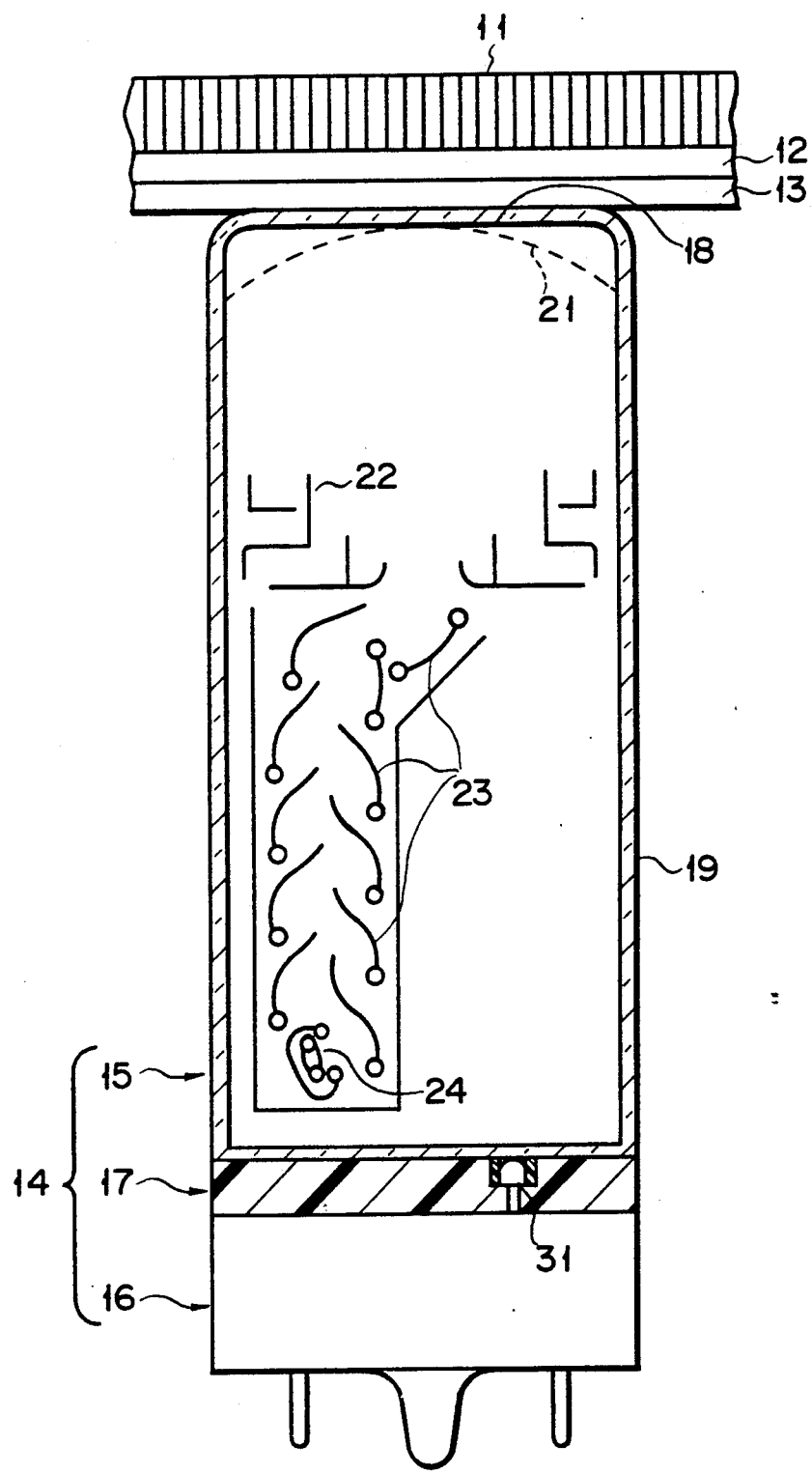
F I G. 1

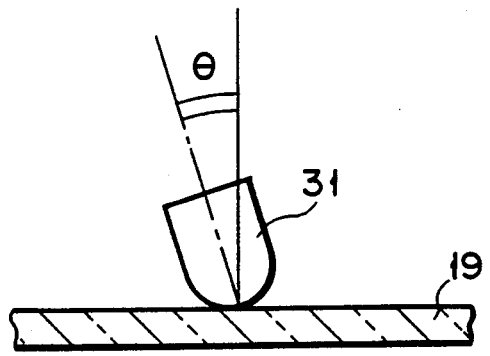
F I G. 4
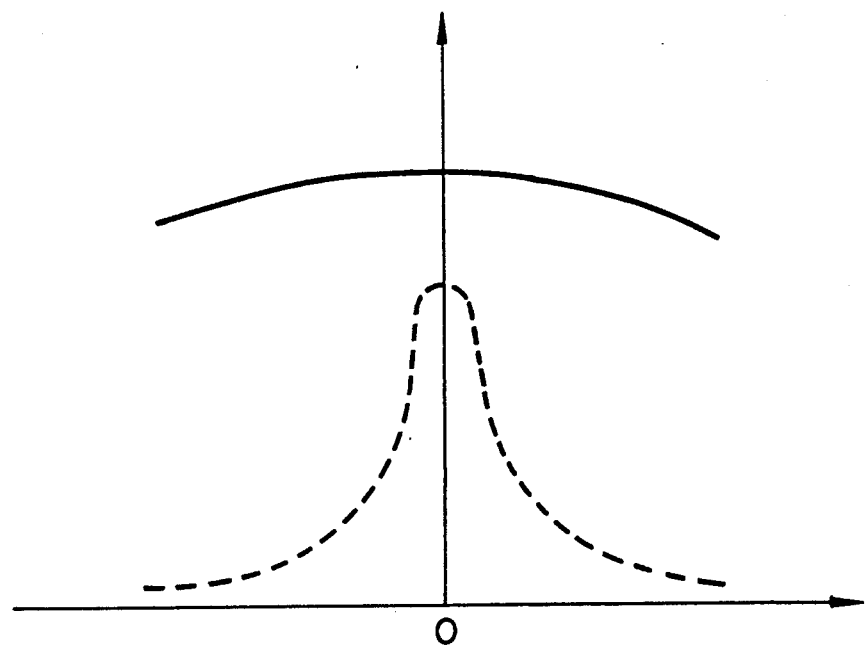
F I G. 5

RADIATION MEASUREMENT SYSTEM

BACKGROUND OF THE INVENTION

1. Field of the Invention

The present invention relates to a radiation measurement system, such as scintillation camera and chemical meter device, and more particularly to an apparatus for controlling the gain of the radiation measurement system.

2. Description of the Related Art

When radioactive radiation emitted from the inside of the human body enters into a scintillator, scintillation light is produced. This scintillation light is converted into an electric signal and is amplified by a predetermined gain by a photomultiplier tube (PMT). This electric signal is further amplified by a predetermined hain by a preamplifier, or the like, and outputted as an output signal. Thereafter, information such as a radiosotope (RI) distribution relating to the light emitting position in the scintillator is obtained on the basis of the output signal, so that the shape, position, size, and the like of the desired porotion of the human body can be obtained.

It sometimes happens during the measurement process that the properties of the change over time and that the gain of the PMT therefore becomes low. In order to prevent this, the gain of the preamplifier is corrected and the level of output signal is adjusted to maintain a constant proportionality in relation to the level of scintillation light. More specifically, a light-emitting diode is fixed to the glass tube of the PMT. A standard light beam from the light-emitting diode is transmitted through the glass tube, introduced into the light receiving face of PMT, the and converted a into standard level signal. A gain correcting value for the preamplifier is obtained from this standard signal thereby to correct the variation in the output signal. The level of the output signal is thus adjusted to maintain a constant proportionality in relation to the standard light.

However, conventionally the light-emitting diode is located in the resin layer between the glass tube and the circuit housing section of the PMT. The light-emitting diode is thus covered by a cylindrical member made of opaque resin and then embedded in the resin layer. This makes it impossible for the standard light beam to be transmitted through the opaque cylindrical member. In other words, the opaque cylindrical member is low in light transmission efficiency and therefore it is difficult to supply the standard light beam having a sufficient quantity of light to the light receiving face of the PMT. Further, happen that the light-emitting diodes are attached to the glass tube at different angles. As this angle becomes larger, therefore, the transmission of the standard light beam is increasingly disturbed by the opaque cylindrical member. As a result, the intensity of the standard light beam is reduced on the light receiving face of the PMT. Because the standard light beam is not consistently supplied to the light receiving face of the PMT, as described above, the gain of the preamplifier cannot be accurately adjusted.

SUMMARY OF THE INVENTION

An object of the present invention is to provide a radiation measurement system capable of supplying a standard light beam, with an ample quantity of light, to the light receiving face of a converter means (or PMT) to enable gain adjustment to be accurately performed.

According to the present invention, a radiation measurement system comprises a scintillator responsive to the incidence of radiation to produce a scintillation light; means for converting the scintillation light received through a light receiving surface into an electric signal; means for amplifying the electric signal by a predetermined gain; means for generating a standard light beam toward the light receiving surface, so that the standard light beam is converted to a standard signal; means for obtaining a gain correction value in accordance with the standard signal, thereby controlling the gain; and means for mounting said generating means on said converting means, and having material for transmitting the standard light beam therethrough, so that the standard light beam may be guided to the light receiving surface.

According to the present invention, a means for attaching a standard light beam generating means to a converting means is made of light-penetrating or transparent material. Therefore, the standard light beam can be transmitted through the attaching means. In other words, the light transmitting efficiency of the attaching means is as improved as to enable the standard light beam to be supplied to the light receiving face of the converting means (or PMT) with a sufficient quantity of light. Even when the attaching angle of the beam generating means is changed, therefore, the transmission of the standard light beam is not disturbed by the attaching means, thereby allowing a sufficient quantity of the standard light beam to be supplied to the light receiving face. As is apparent from the above, a sufficient quantity of the standard light beam can be supplied to the light receiving face of the converting means (or PMT) so that gain adjustment can be accurately achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a sectional view showing an embodiment of the scintillation camera according to the present invention;

FIG. 4 shows the angle at which the light-emitting diode is attached to the PMT;

FIG. 5 shows the relation of the diode attaching angle to the light quantity of the standard light beam incident onto the PMT;

DETAILED DESCRIPTION OF THE PREFERRED EMBODIMENTS

Figure 2:
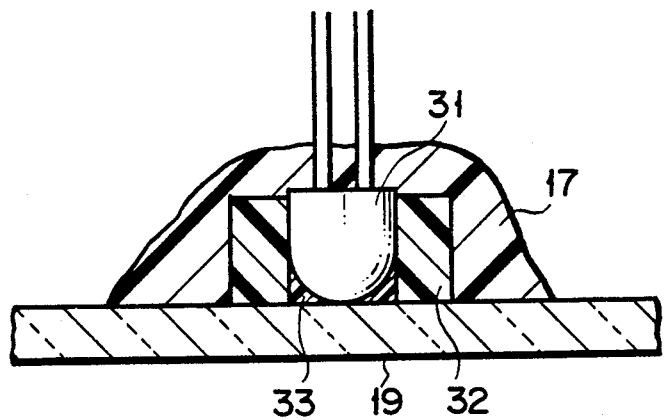
FIG. 2 is a sectional view showing an arrangement for attaching a light-emitting diode to the PMT shown in FIG. 1.

FIG. 1 shows an example of a scintillation camera according to the present invention. This scintillation camera includes collimator 11, scintillator 12, light guide 13, and photomultiplier tube (PMT) 14. The PMT 14 includes a vacuum tube section 15 for photoelectrically converting scintillation light, a circuit housing section 16 for housing a circuit for carrying out electric processes such as an amplifying process, and a resin layer 17 interposed between the vacuum tube section 15 and the circuit housing section 16. The PMT 14 shown in FIG. 1 is of the head-on (or end-on) type, but the present invention can be applied to a PMT of the side-on type.

When radioactive radiation emitted from the inside of the human body enters into scintillator 12 through collimator 11, scintillation light is created. When this scintillation light is introduced onto the light receiving face 18 of the vacuum tube section 15 of the PMT 14 through light guide 13, photoelectrons are discharged by the photocathode 21. The photo electrons are accelerated and focused by a focusing electrode 22 and then introduced into a plurality of hynodes 23. Secondary electrons are discharged and amplified by these dynodes 23 and after this amplification is repeated, the output is picked up by an ande 24. This output of the PMT is applied to a preamplifier, which includes an auto-gain controller and the like, and is amplified by a predetermined gain. The output signal of the preamplifier is then applied to an image processing section where information, such as the RI distribution relating to the light-emitting position in the scintillator, is obtained.

It sometimes happens during the measurement process that the gain of the PMT becomes low. In order to prevent this, the gain of the preamplifier is corrected and the level of output signal of the preamplifier is adjusted to maintain a constant proportionality relative to the scintillation light. The scintillation camera according to the present invention includes a means for controlling the gain of the preamplifier.

More specifically, light-emitting diode 31 having semispherical light emitting face and producing a standard light beam of high directivity is located in resin layer 17 of the PMT 14. The standard light beam from light-emitting diode 31 is transmitted through the glass tube 19 in vacuum tube section 15, introduced onto the light receiving face 18 of the PMT 14, and converted into a standard signal. The gain correcting value for the preamplifier is obtained from this standard signal. As a result, the gain of the preamplifier is corrected. The level of the output signal is thus adjusted to remain proportional relative to the standard light.

Figure 3:
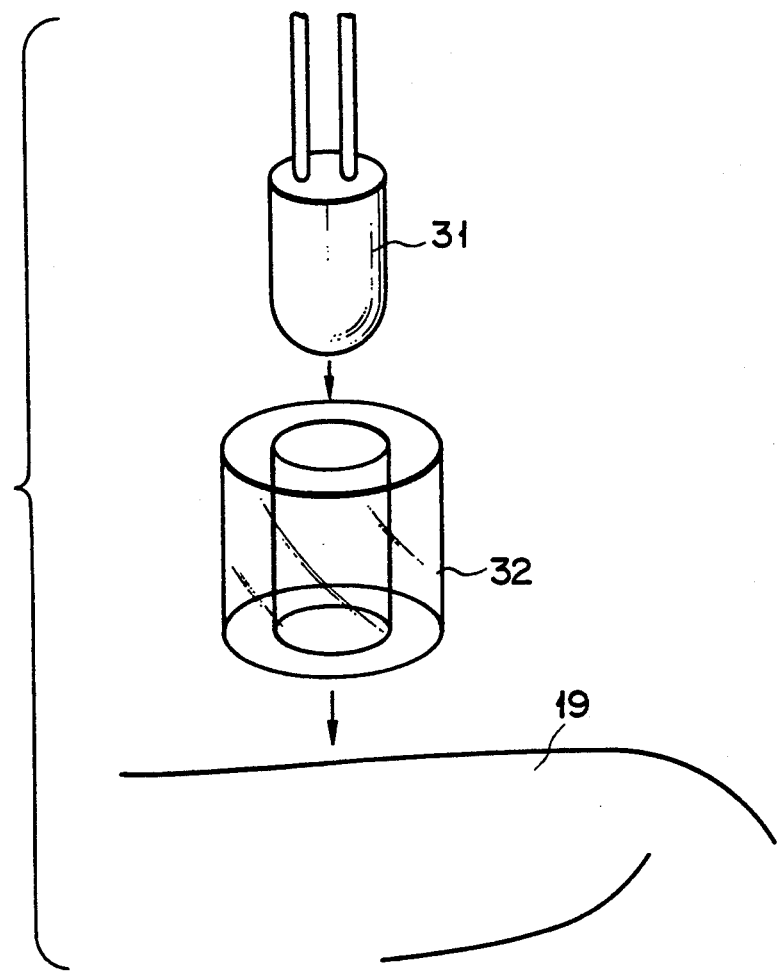
FIG. 3 is an exploded perspective view showing a diode attaching arrangement.

According to the present invention, the light emitting end of light-emitting diode 31 is inserted into cylindrical member 32 made of a transparent resin such as acrylic resin and this cylindrical member 32 is embedded in resin layer 17 during the molding process, as shown in FIGS. 2 and 3. Further, the internal space in cylindrical member 32 that is defined by the light emitting end of the diode 31 and the glass tube 19 is filled with a transparent filler 33 having a bonding effect on the structure, preferably an optical adhesive.

As described above, cylindrical member 32 is made of a transparent resin and the internal space in cylindrical member 32 is filled with a transparent filler 33. The standard light beam can be thus transmitted through the cylindrical member 32 and the transparent filler 33. In short, their light transmitting efficiencies are sufficient so that an ample quantity of the standard light beam can be supplied to the light receiving face 18 of the PMT 14.

A shown in FIG. 4, the angle $\theta$ between the light-emitting diodes 31 and the glass tube 19 is not always constant. As the angle $\theta$ becomes larger, the light quantity of the standard light beam incident on the light receiving face 18 is made smaller, as seen in the conventional case in FIG. 5.

According to the present invention, however, cylindrical member 32 is made of a transparent resin and the internal space in the cylindrical member 32, defined by the light emitting end of diode 31 and the glass tube 19, is filled with a transparent filler 33. Even when the angle $\theta$ becomes large, therefore, the transmission of the standard light beam is not disturbed by the cylindrical member 32 and the transparent filler 33 so that the light quantity of the standard light beam supplied to the light receiving face 18 of the PMT 14 can remains substantially constant.

As is apparent from the above, the present invention enables a sufficient quantity of the standard light beam to be supplied to the light receiving face 18 of the PMT 14. Gain adjustment can be accurately attained accordingly.

Resin layer 17 may be made of transparent resin.

Figure 6:
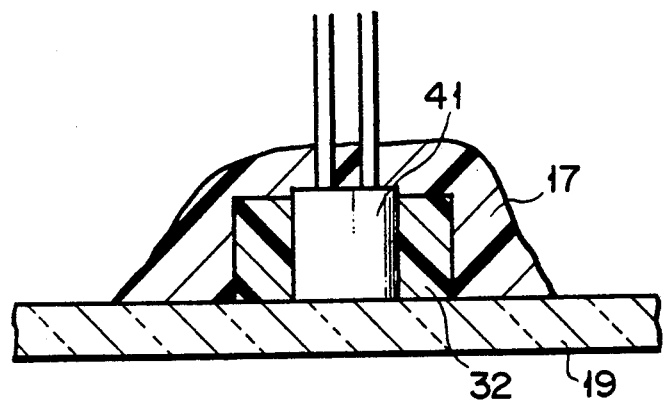
FIG. 6 is a sectional view showing another arrangement for attaching the light-emitting diode to the PMT.
Figure 7:
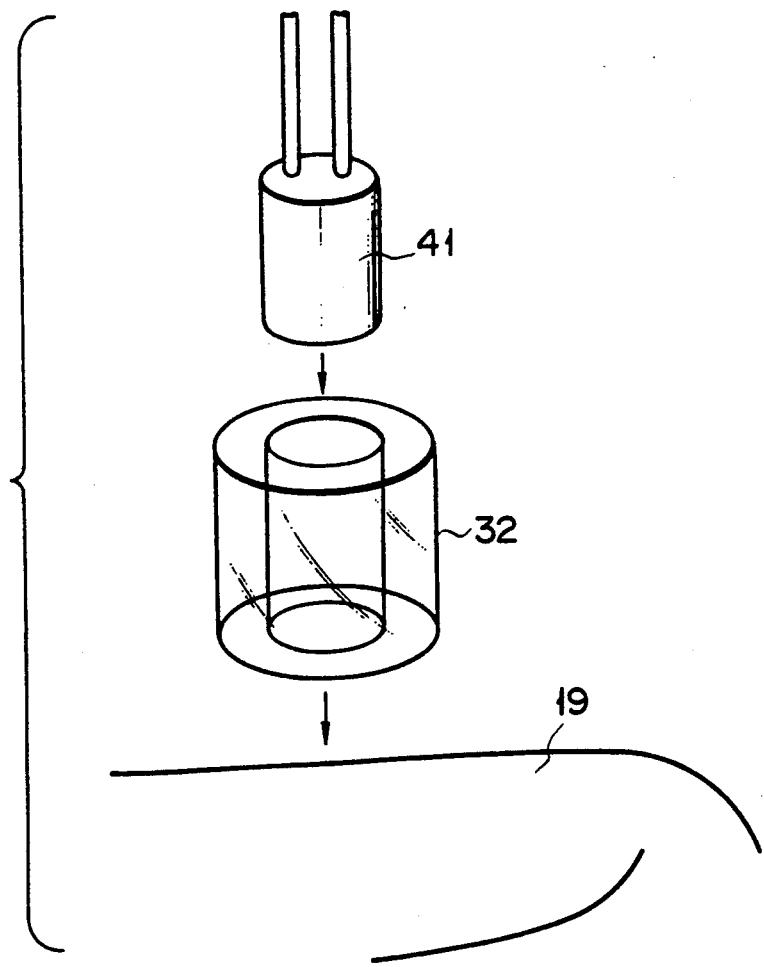
FIG. 7 is an exploded perspective view showing the diode attaching arrangement in FIG. 6.

FIGS. 6 and 7 show another embodiment of the present invention. Light-emitting diode 41 has a flat light-emitting end face and produces a standard light beam of low (or wide) directivity.

When light-emitting diode 41 is attached to the glass tube 19, therefore, the positioning of the light-emitting diode 41 can be accurately attained. In addition, light-emitting diode 41 can be easily attached to the glass tube 19 at a predetermined angle. The variation in of the incident light quantity of the standard light beam caused by the variation of the attaching angle $\theta$ can be reduced.

Further, light-emitting diode 41 produces a standard light beam which is low (or wide) in directivity. Therefore, the standard light beam is more diffusable, as compared with the case where a light beam with high directivity is produced. The transmitting efficiency of the standard light beam can be improved.

Although the present invention has been described with reference to two embodiments related to a scintillation camera, the present invention may be applied to other radiation measurement apparatuses, such as chemical meters.

A concrete example of the gain control device will be briefly described. In this device, gain adjustment is carried out while radiation is being measured, but it should be understood that again adjustment may be carried out when radiation is not being measured. Offset correction will be briefly described, too.

Figure 8:
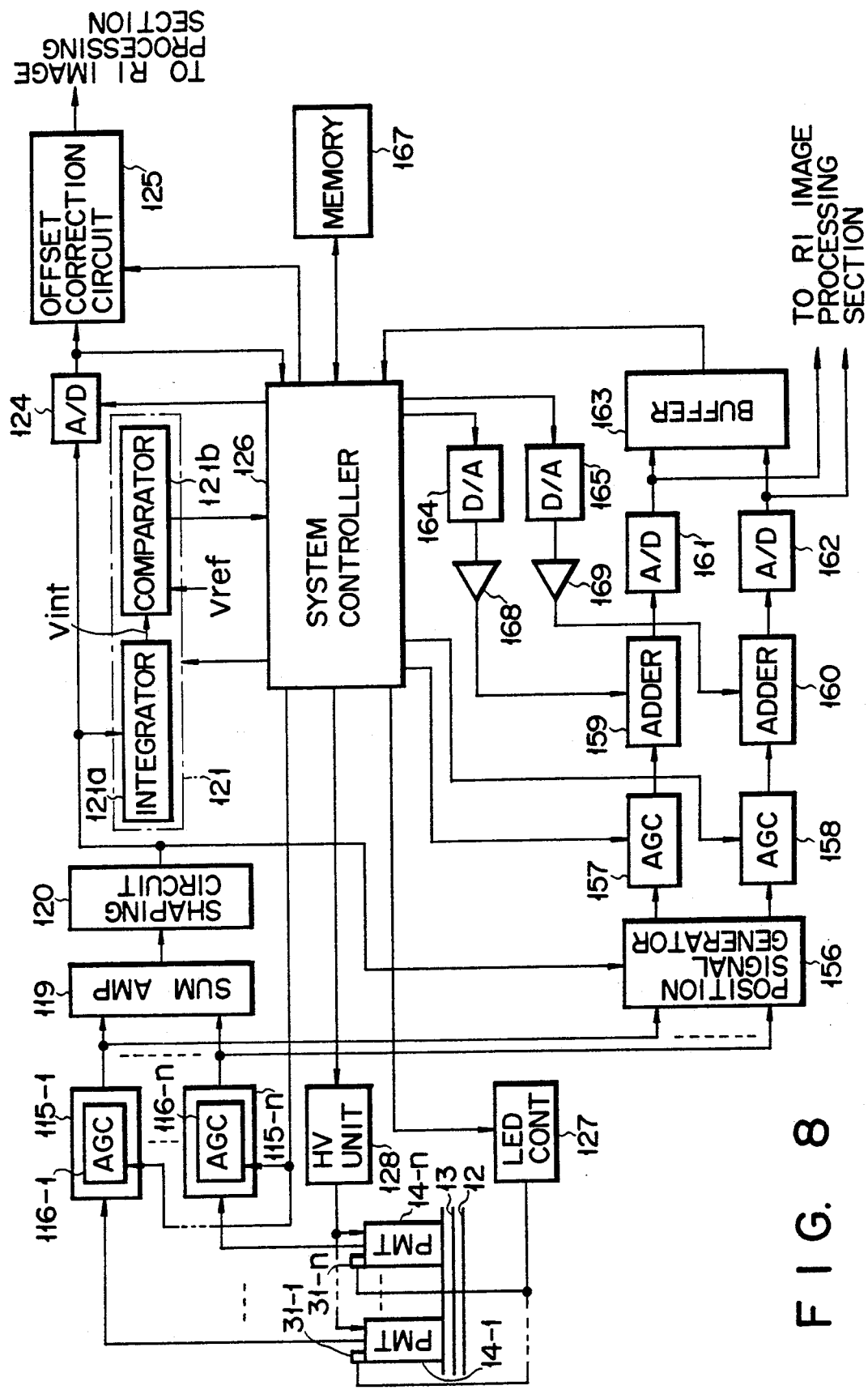
FIG. 8 is a block diagram showing a circuit for the radiation measurement system.

Referring now to FIG. 8, there is illustrated a gain control system.

Figure 9:
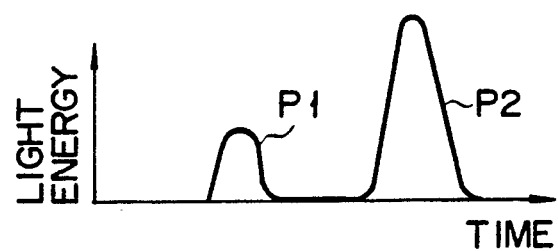
FIG. 9 shows a waveform of a standard light beam produced by the light-emitting diode.

Standard lights produced by LEDs 31-1 to 31-n are directed to PMTs 14-1 to 14-n which are driven by an HV unit 128. LEDs 31-1 to 31-n each produce two types of standard light P1 and P2, which vary in the quantity of light, under the control of LED controller 127, as shown in FIG. 9. A scintillator 12 produces scintillations in response to the incidence of radiation. A light 13 directs the produced scintillations to the PMTs 14-1 to 14-n.

Figure 10:
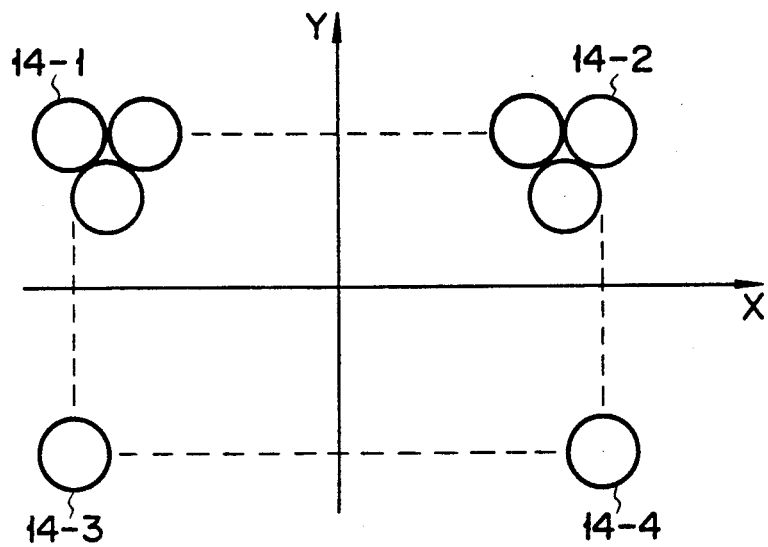
FIG. 10 shows a two-dimensional array of photomultiplier tubes.

FIG. 10 shows a two-dimensional array (X direction, Y direction) of PMTs 14-1 to 14-n. LEDs 31-1 to 31-n are placed at the PMTs 14-1 to 14-n, respectively. Alternatively, for example, LEDs 31-1 to 31-4 may be placed near the PMTs 14-1 to 14-4 that are located at the four corners of the PMT array comprised of PMTs 41-1 to 14-n. LEDs 31-1 to 31-n produce light of a spectrum that is close to the optical spectrum of the scintillator 12, for example, green light, as a standard light. LEDs 31-1 to 31-n are driven by current pulses having a predetermined duty ratio from the LED controller 127.

Preamplifiers 115-1 to 115-n are associated with PMTs 14-1 to 14-n and include automatic gain control (AGC) circuits 116-1 to 116-n, respectively. The gain of each preamplifier 115-1 to 115-n is controlled by system controller 126 comprised of, for example, a central processing unit (CPU). The output signals of the preamplifiers 115-1 to 115-n are applied to a shaping circuit 120 via a summing amplifier 119.

A/D converter 124 converts an analog signal output from the shaping circuits 120 to a digital signal, and applies the digital signal to an offset correction circuit 125. Offset correction circuit 125 corrects the offset of the digital by changing the measured data in accordance with an offset correction value.

A method of calculating the offset correction value will now be described.

Figure 11:
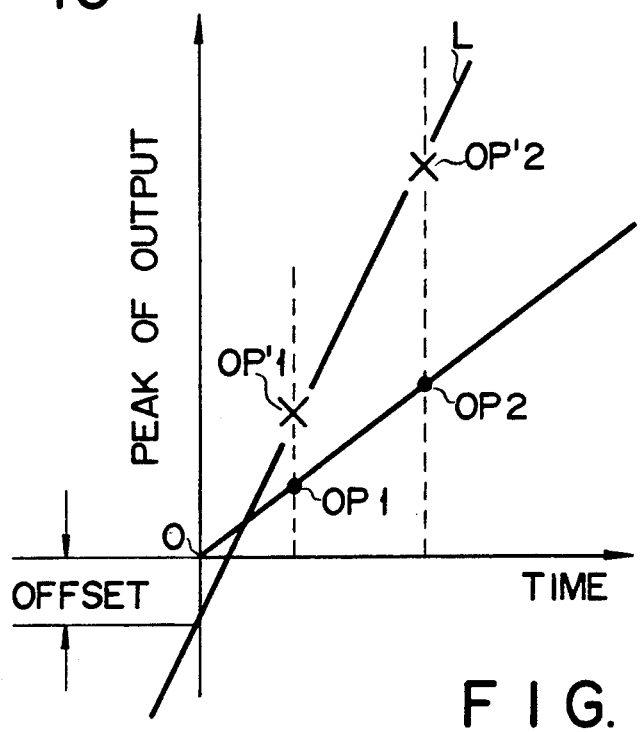
FIG. 11 explains offset detection.

When standard light P1 and P2 and incident on the PMT 14-1 to 14-n at different points in time, the peak value of the corresponding output signal of the A/D converter 124 (without offset correction) assumed to be OP1 and OP2, respectively, as shown in the graph of FIG. 11. It is assumed are adjusted such that a straight line connecting OP1 and OP2 passes through the origin 0. When the PMTs 14-1 to 14-n are irradiated with standard lights P1 and P2 again after the lapse of a predetermined time, if the output peak values of A/D converter 124 are shifted to OP1' and OP2', then a straight line L connecting OP1' and OP2' would not pass through the origin 0. The deviation of straight line L with respect to the origin O corresponds to the quantity of offset. The offset correction value is used for correcting the deviation.

System controller 126 calculates a gain correction value in accordance with an output signal of the A/D converter 124 obtained when PMTs 14-1 to 14-n are irradiated with the standard light. The gains of the preamplifiers 115-1 to 115-n are controlled in accordance with the gain correction value with the effect that the gains to PMTs 14-1 of the 14-n are controlled indirectly. System controller 126 calculates also the above offset correction value. The PMTs generally have statistical fluctuations. Thus, several measurements of the standard light and calculation of the an arithmetic mean of measured data will allow the gain correction value and the offset correction value to be determined more accurately. It is noted that the measurement of the standard light is performed under the control of system controller 126.

Superimposed-light detector 121 detects incidence of scintillations to the PMTs 14-1 to 14-n during measurement of the standard light. The detection of scintillations is performed by monitoring the output signals of the shaping circuit 120. Superimposed-light detector 121 includes an integrator 121a for integrating an output signal of the shaping circuit 120 for until a predetermined period of time, beginning from he emission of the standard light, and a comparator 121b for comparing an output voltage Vint of integrator 121a with a reference voltage Vref. When Vint>Vref in comparator 121b, that is, when the standard light and the scintillations are simultaneously incident on the PMTs 14-1 to 14-n within the predetermined time period, superimposed-light detector 121 outputs an inhibit signal to system controller 126. Upon receipt of the inhibit signal, system controller 126 inhibits the operation of A/D converter 124. In other words, when the standard light and the scintillations are simultaneously incident on the PMTs 14-1 to 14-n, the output signal of A/D converter 124 is not utilized for offset and gain correction.

On the other hand, the output signals of PMTs 14-1 to 14-n, amplified in preamplifiers 115-1 to 115-n, are applied to a position signal generator 156. The position signal generator 156 calculates a position of incidence of radiation on the PMTs on the basis of the output signals of preamplifiers 115-1 to 115-n and provides position signals representing the position of incidence to AGC circuits 157 and 158. The position signals include an X signal and a Y signal.

The AGC circuits 157 and 158 corrects the gain of the position signals output from the position signal generator 156. The gain correction is performed by gain correction signals representing gain correction values output from the system controller 126.

Adders 159 and 160, each of which may be comprised of an operational amplifier, add offset correction signals representing offset correction values to the output signals of the AGC circuits 157 and 158 to produce gain-corrected position signals.

The A/D converters 161 and 162 convert the analog signals output from the adders 159 and 160 to digital signals. The digital signals output from the A/D converters 161 and 162 when the standard light is emitted are applied to the system controller 126 via a buffer 163. On the other hand, when measured radiation data detected, such data is applied to an RI image processor (not shown) to be used for formation of an RI image.

System controller 126 is responsive to the output signal of buffer 163 to produce the gain correction signal and the offset correction signal.

The gain correction signal is used for correcting variations in gain in the X and Y directions and . obtained comparing the position signal output from buffer 163 with an initial position signal, which is previously determined, and calculating a gain variation based upon the difference resulting from the comparison. The gain correction signal is applied to the AGC circuits 157 and 159.

The offset correction signal is used for correcting variations in offset in the X and Y directions and is obtained by comparing the position signal output from buffer 163 with an initial position signal, which is previously determined, and calculating an offset variation based upon a difference resulting from the comparison. The offset correction signal output from the system controller 126 is converted to an analog signal by the D/A converters 164 and 165 and then applied to adders 159 and 160 via buffers 168 and 169.

It is noted that the initial position signal is a position signal obtained during the first emission of the standard light and is stored in a memory 167.

Additional advantages and modifications will be readily apparent to those skilled in the art. Therefore, the invention in its broader aspects is not limited to the specific details, and representative devices shown and described. Accordingly, various modifications may be made without departing from the spirit or scope of the general inventive concept as defined by the appended claims and their equivalents.

What is claimed is:

1. A radiation measurement system comprising:

a scintillator responsive to the incidence of radiation to produce scintillation light;

means having a light-receiving surface for converting scintillation light received through the light-receiving surface into an electric signal, said converting means including a glass tube connected to the light-receiving surface;

means for amplifying the electric signal by a predetermined gain;

means for generating a standard light beam and directing said beam toward the light-receiving surface;

means for calculating a gain correction value in accordance with s standard signal received from said converting means in response to the incidence of said standard light beam; and means for mounting said generating means in said converting means including material for transmitting the standard light beam therethrough to the light-receiving surface, said mounting means including a cylindrical member arranged on the glass tube, said cylindrical member having an internal space for housing the generating means to allow the standard light beam to pass therethrough, and means comprising a standard light beam to pass therethrough, and means comprising a filler located in the internal space for securing said generating means in the space, and for allowing the standard light beam to pass therethrough with accurate positioning and alignment.

2. The radiation measurement system according to claim 1, wherein said mounting means includes a resin layer for securing the cylindrical member to the glass tube.

3. The radiation measurement system according to claim 1, wherein said converting means includes a photomultiplier tube.

4. The radiation measurement system according to claim 1, wherein said generating means includes a light emitting diode.

5. The radiation measurement system according to claim 4, wherein said light-emitting diode includes a semispherical light-emitting end face and produces a light beam with high directivity.

6. The radiation measurement system according to claim 4, wherein aid light-emitting diode includes a flat light-emitting end face and produces a light beam with low directivity.

7. A gain control apparatus in a radiation measurement system which includes means having a light-receiving surface for converting scintillation light received through the light-receiving surface into an electric signal, said converting means including a glass tube connected to the light-receiving surface, and means for amplifying the electric signal by a predetermined gain, said control apparatus comprising:

means for generating a standard light beam and directing said beam toward the light-receiving surface;

means for calculating a gain correction value in accordance with a standard signal received from the converting means in response to the incidence of said standard light beam; and means for mounting said generating means in said converting means including material for transmitting the standard light beam therethrough to the light-receiving surface, said mounting means including a cylindrical member arranged on the glass tube, said cylindrical member having an internal space for housing the generating means to allow the standard light beam to pass therethrough, and means comprising a filler located in the internal space for securing said generating means in the space, and for allowing the standard light beam to pass therethrough with accurate positioning and alignment.

8. The gain control apparatus in a radiation measurement system according to claim 7, wherein said generating means includes a light-emitting diode having a flat light-emitting end face and producing a light beam with low directivity.

9. A scintillation camera system comprising:

a scintillator responsive to the incidence of radiation to produce scintillation light;

means having a light-receiving surface for converting scintillation light received through the light-receiving surface into an electric signal, said converting means including a glass tube connected to the light-receiving surface;

means for amplifying the electric signal by a predetermined gain;

means for generating a standard light beam and directing said beam toward the light-receiving surface;

means for calculating a gain correction value in accordance with a standard signal received from said converting means in response to the incidence of said standard light beam; and means for mounting said generating means in said converting means including material for transmitting the standard light beam therethrough to the light-receiving surface, said mounting means including a cylindrical member arranged on the glass tube, said cylindrical member having an internal space for housing the generating means to allow the standard light beam to pass therethrough, and means comprising a filler located in the internal space for securing said generating means in the space, and for allowing the standard light beam to pass therethrough with accurate positioning and alignment.

* * * * *

UNITED STATES PATENT AND TRADEMARK OFFICE
CERTIFICATE OF CORRECTION

PATENT NO. : 5,079,424

DATED : January 07, 1992

INVENTOR(S) : Hiroaki Kobayashi

It is certified that error appears in the above-identified patent and that said Letters Patent is hereby corrected as shown below:

Claim 1, column 7, line 27, change "s" to --a--.
Claim 6, column 7, line 59, change "aid" to --said--.

Signed and Sealed this

Twentieth Day of July, 1993

Attest:

MICHAEL K. KIRK

Attesting Officer

Acting Commissioner of Patents and Trademarks